May 13, 1958     E. G. PICKELS     2,834,247
OPTICAL DENSITY ANALYZING APPARATUS
Filed Jan. 26, 1955     5 Sheets-Sheet 1
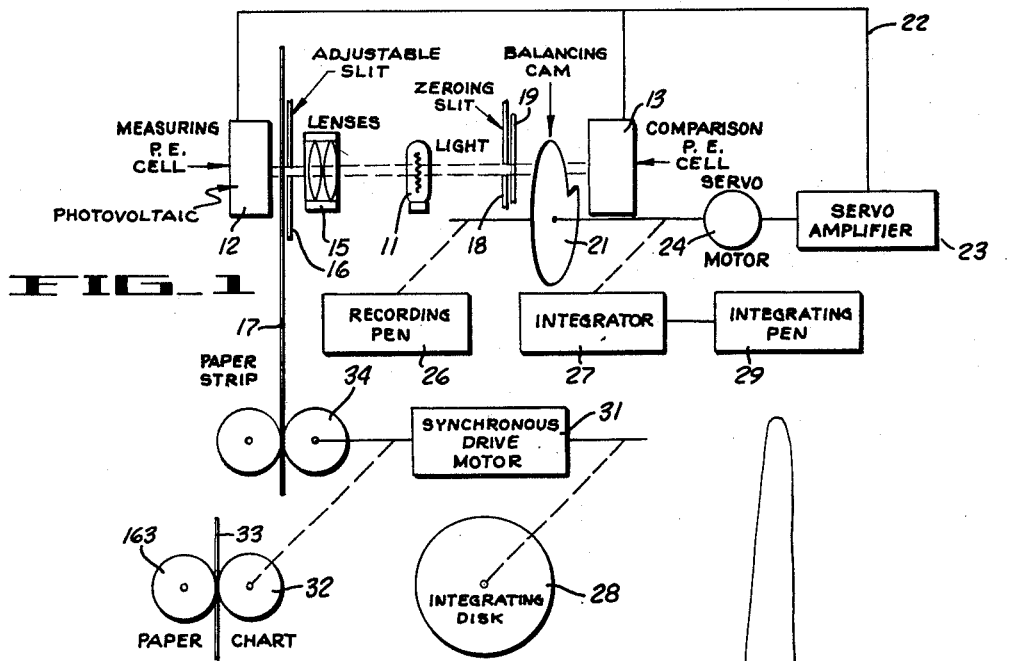
FIG_1
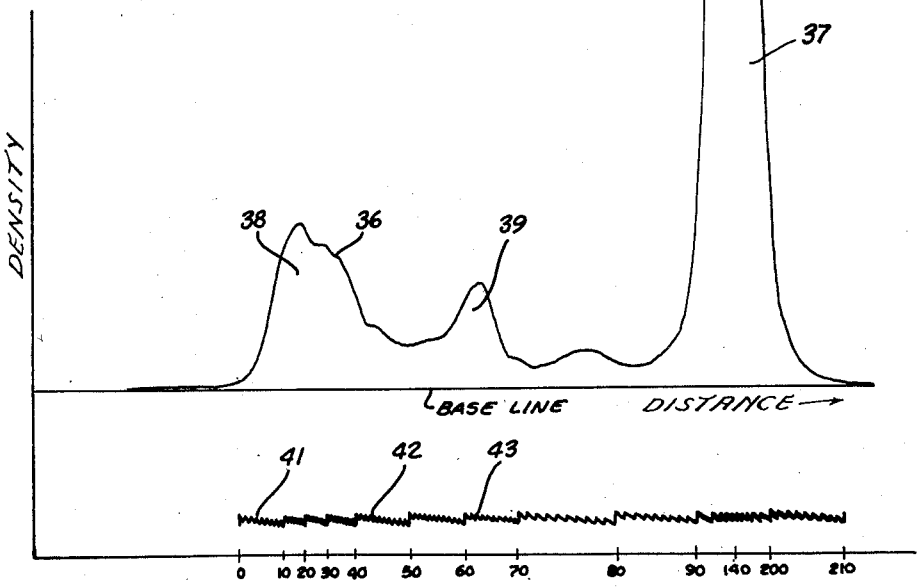
FIG_2
EDWARD G. PICKELS
INVENTOR
BY
ATTORNEYS May 13, 1958 E. G. PICKELS 2,834,247
OPTICAL DENSITY ANALYZING APPARATUS
Filed Jan. 26, 1955 5 Sheets-Sheet 2
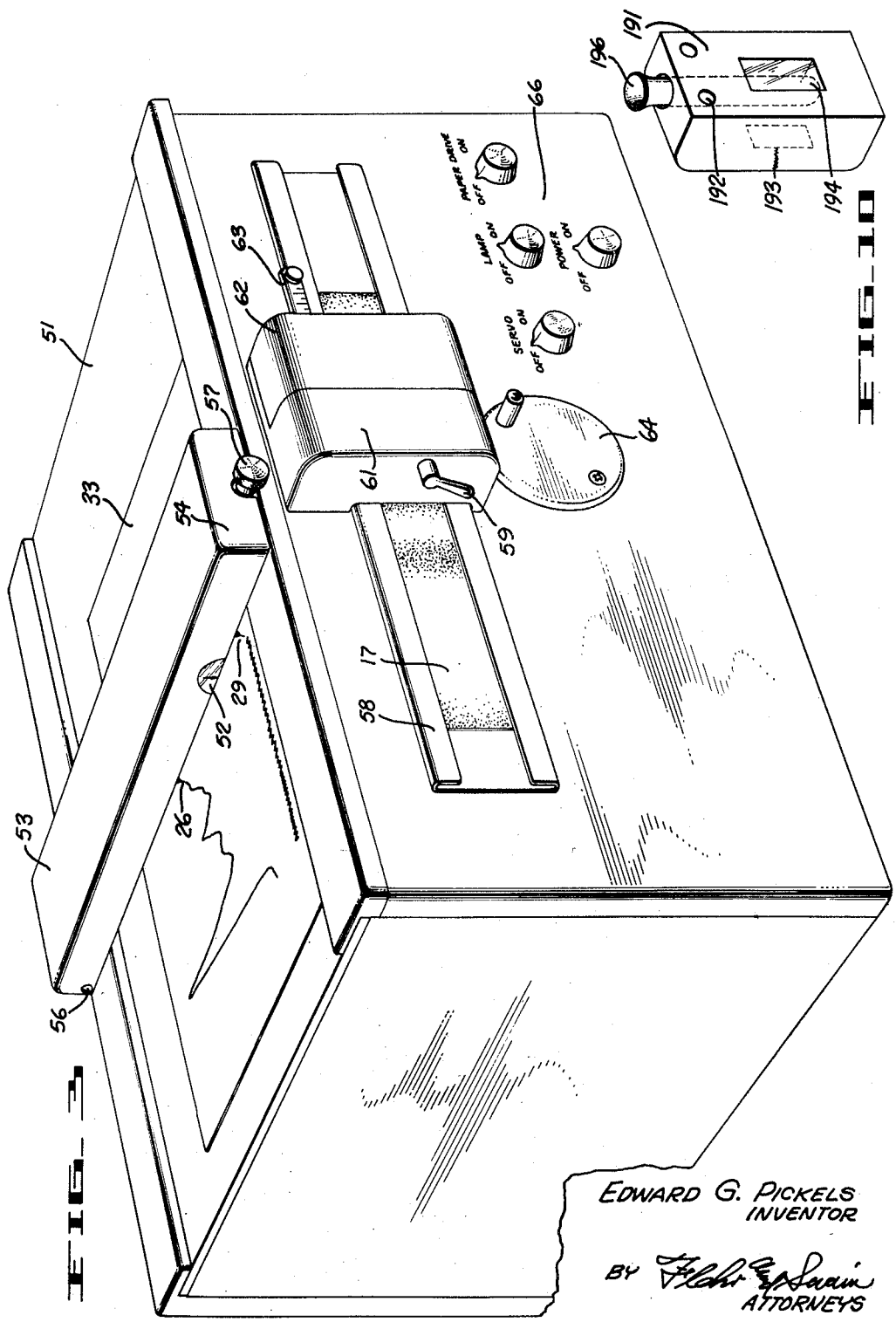
Edward G. Pickels
INVENTOR
BY
ATTORNEYS Edward G. Pickels
INVENTOR

ATTORNEYS

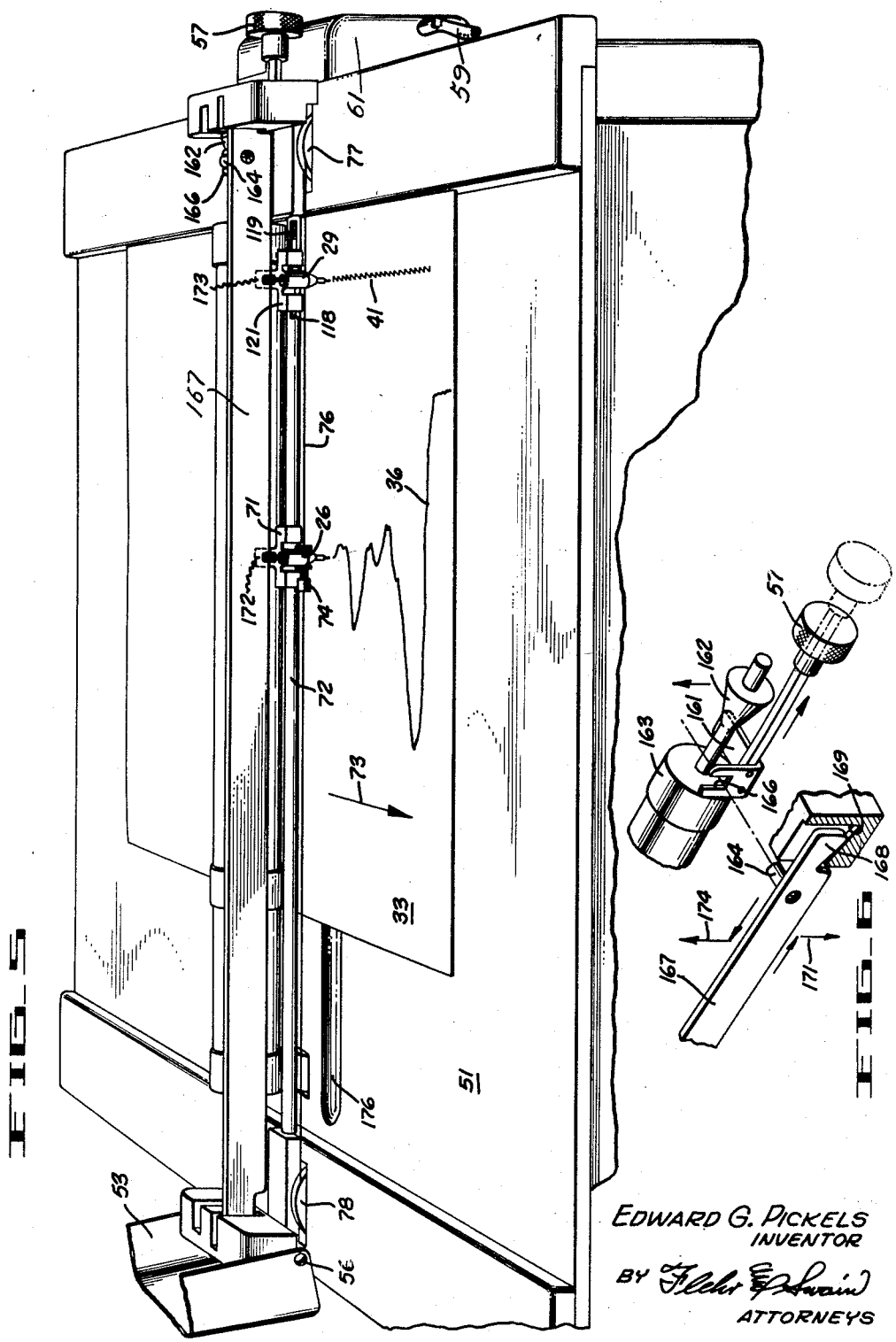

May 13, 1958 E. G. PICKELS 2,834,247
OPTICAL DENSITY ANALYZING APPARATUS
Filed Jan. 26, 1955 5 Sheets-Sheet 5
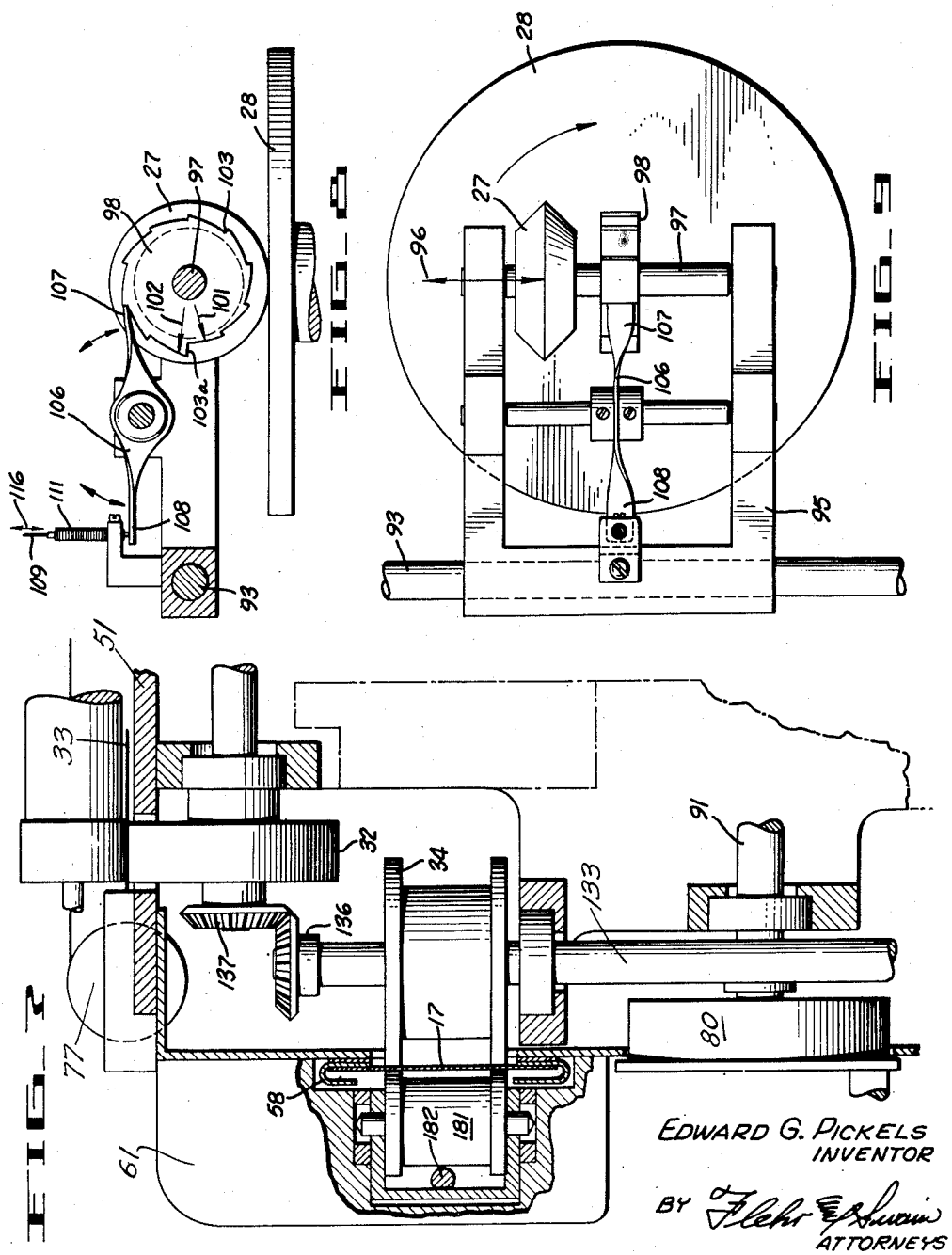
Edward G. Pickels
INVENTOR
ATTORNEYS United States Patent Office 2,834,247
Patented May 13, 1958

2,834,247

OPTICAL DENSITY ANALYZING APPARATUS

Edward G. Pickels, Atherton, Calif., assignor to Beckman Instruments, Inc., Fullerton, Calif., a corporation of California Application January 26, 1955, Serial No. 484,268

4 Claims. (Cl. 88—14)

This invention relates generally to apparatus for analyzing mediums with respect to variations in light transmission characteristics. More particularly it pertains to apparatus suitable for analyzing dyed or pigmented paper strips such as are produced in electrophoretic, ionophoretic or chromatographic investigations.

Since first introduced, the technique of paper electrophoresis has received increasing acceptance for many laboratory and clinical determinations. This is attributed mainly to the simplicity of the equipment required, and to the fact that it is well adapted for making quick routine determinations on blood serums and other protein solutions. Electrophoresis is generally carried out as follows: A strip of filter paper or like absorbent material is draped over a rod with its ends dipping into electrolyte cells. After saturating the paper with a solution of proper pH, the protein or other solution under observation is applied across the strip. An electrical current of controlled value is caused to flow through the strip whereby various protein fractions are caused to separate. After a predetermined period of time the strip is removed from the apparatus and dried, whereby the protein fractions are fixed by heat coagulation. Then a suitable dye is applied to the strip whereby the separate fractions are made visible. In general, variations in the light transmission characteristics of the strip (i. e. variations in density) over the dyed regions are related to the concentration of separated protein fractions. When such variations are measured, a quantitative analysis of the protein fractions is provided.

Prior methods and equipment used for density determinations of the dyed strip have been unsatisfactory for quick laboratory determinations. For example, one method which has been used involves cutting the strip into different sections and then eluting the dye from each section. After extraction of the dye, the optical density of the eluting solution is measured and the resulting values are plotted on a curve as a function of distance along the original strip. It will be evident that this method is time consuming and requires many laboratory operations. Another method which has been used for this purpose is to saturate the paper with an oil to make it more transparent. The paper is passed over an illuminated slit and the amount of light passed through the paper measured by suitable photoelectric means. Again a curve is obtained of density as a function of distance along the paper strip. This method has the disadvantage that any variation in output of the light source leads to error in the determination of the density.

In general, it is an object of the present invention to provide apparatus suitable for analyzing dyed electrophoresis strips such as described above, which will make possible a quick and relatively accurate analysis of the separated fractions.

Another object of the invention is to provide apparatus of the above character which will continually plot a curve of density variations as a function of time or distance.

Another object of the invention is to provide apparatus of the above character which will perform an integrating operation simultaneously with the plotting of a density curve.

Another object of the invention is to provide improved recording means for apparatus of the above character.

Another object of the invention is to provide apparatus of the above character which makes use of a single replaceable part which is contoured to represent a particular predetermined mathematical function.

Another object of the invention is to provide apparatus of the above character which can be modified to provide various density determinations, in addition to making density determinations with respect to dyed electrophoresis strips.

Additional objects and features of the invention will appear from the following description in which the preferred embodiment has been set forth in detail in conjunction with the accompanying drawings.

Referring to the drawings:

Figure 1 is a schematic view of complete apparatus incorporating the present invention;

Figure 2 is a reproduction of a curve of density as a function of distance, together with a saw-tooth tracing representing the area along the curve;

Figure 3 is a perspective view of the complete apparatus showing the controls, a paper strip and a chart;

Figure 5 is a perspective view of the table, showing the pens, pen carriage assembly and chart feed rollers;

Figure 6 is an enlarged view of the pen lifting and chart feed roller release;

Figure 7 is a side elevational view showing the paper feed roller and chart feed roller, together with associated gearing;

Figure 8 is a side elevational view of the integrator and saw-tooth trace generator;

Figure 9 is a top view of the apparatus of Figure 8; and

Figure 10 is a perspective view of an adaptor for analyzing chemical solutions.

Figure 4:
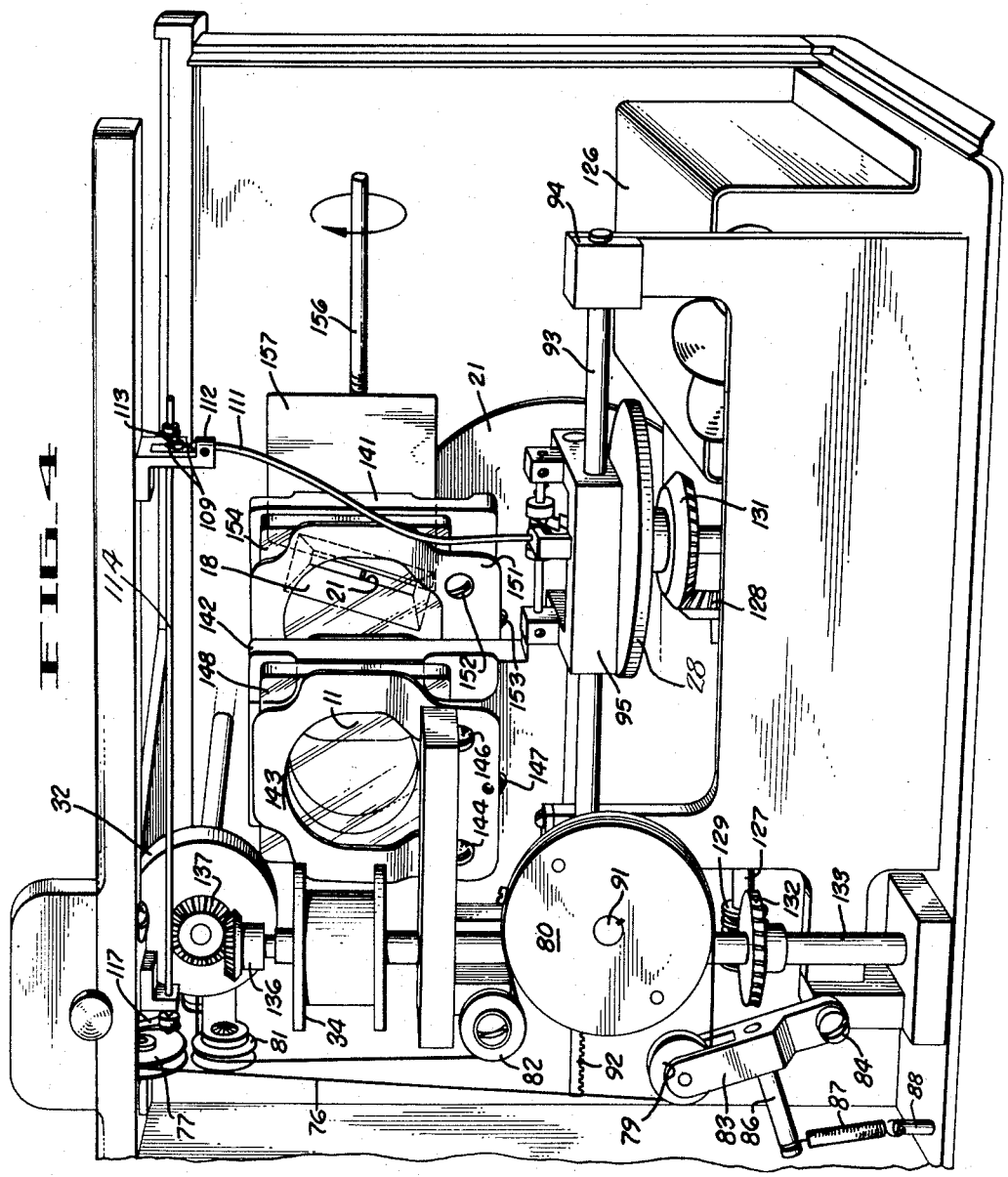
Figure 4 is a perspective view of the apparatus with the front cover removed.

In accordance with the present invention, a paper strip which has been prepared by established electrophoretic or chromatographic methods and for which the density along the strip is to be determined is scanned with a light beam. The light transmitted is received by a suitable photocell. A second photocell receives light which passes through a slit which has its opening controlled by a cam or light occluding shutter contoured to a desired mathematical function. The output voltage of the photocells is opposed and the difference voltage is applied to a servomechanism which drives the cam in such a manner as to equalize the light incident on the two photocells. The servo-mechanism also drives a recording pen which records the position of the cam which in turn is an indication of the density of the strip. The recording chart movement is synchronized with the scanning of the paper strip and the curve obtained represents density as a function of distance. A second mechanism automatically integrates the curve and traces the integrated value on the same chart.

The apparatus of my invention will be more clearly understood from the schematic diagram of Figure 1. A source of radiant energy 11 furnishes illumination for the photocells 12 and 13. As will be presently described, the source 11 may be of the incandescent type connected directly to the power lines, or may be of the ultraviolet type having a quartz envelope, both of which radiate energy. The radiant energy incident upon the measuring photoelectric cell 12 passes through lenses 15 which focus the energy on the photoelectric cell. The amount of energy which strikes the photoelectric cell is controlled by the adjustable slit 16 which also controls the resolution of the system. With a narrow slit, the resolution is increased and small variations in density may be detected.

The sample which is to be analyzed, in this case paper strip 17, is placed between the adjustable slit 16 and the photoelectric cell 12. The radiation incident on the photoelectric cell 12 is directly dependent upon the transmitting characteristics of the portion of the paper strip 17 lying adjacent the slit.

Illumination from the light source 11 also falls on the comparison photoelectric cell 13. The incident radiation passes through the zeroing slit 18, the vertical mask 19 and past the cam shaped shutter 21. The balancing cam 21, rotated in a manner to be presently described, has a contour which varies in such a manner that the amount of light incident upon the photoelectric cell 13 is dependent upon the position of the cam 21. The output of the photocells 12 and 13 is connected in such manner that the difference voltage appears on the line 22. This voltage is fed to the servo amplifier 23 which includes a chopper and an A.-C. amplifier with an output signal proportional to the input signal and having a polarity which is related to the input signal. Consequently if the output of the photoelectric cell 12 is greater than that of photoelectric cell 13, the servo amplifier will drive the servomotor 24 in a predetermined direction. On the other hand, if the output of photoelectric cell 13 is greater than that of photoelectric cell 12, then the servo amplifier 23 will drive the motor 24 in an opposite direction.

It is seen that if the photoelectric cells 12 and 13 are chosen such that they are identical, then the servomotor will rotate the balancing cam 21 to a position where the illumination of the two photocells is equal. As the paper 17 moves across the slit 16 and the density varies the servomotor will drive the balancing cam accordingly and maintain the difference voltage in line 22 substantially equal to zero. By properly selecting the contour of the cam 21, it is possible to make the angular position of the balancing cam 21 any mathematical function of optical density. In actual practice, the balancing cam 21 is contoured to a function which permits calibration according to known standards in the electrophoresis field.

The servomotor 24 is linked to the recording pen 26 and the integrator 27. The recording pen 26 moves linearly across the chart as the balancing cam 21 is rotated. The integrator 27 is moved back and forth across the integrating disk 28 in a manner to give an output which is proportional to the area under the curve plotted by the recording pen 26. Synchronous motor 31 drives the integrating disk 28, the chart drive 32 which drives the paper chart 33, and the paper drive 34 which drives the paper strip 17.

Since the paper chart drive 32 and the paper strip drive 34 are driven by the same motor and are provided with the proper gear ratio, the paper chart will pass the recording pen 26 at the same velocity as the paper strip 17 passes the adjustable slit 16. The recording pen 26 moves perpendicularly to the motion of the chart 33 and the movement is dependent upon the position of the balancing cam 21. A curve of density as a function of distance along the paper strip 17 is plotted. Such a curve is shown in Figure 2 as curve 36. At point 37 the density of the paper strip is greatest. At positions 38 and 39, the density is intermediate. The saw-tooth tracing 41 is an indication of the area under the curve 36. The saw-tooth tracing 41 has a series of small saw-teeth 42 together with larger saw-teeth 43. The larger saw-teeth 43 occur every tenth tooth, that is, after every nine saw-teeth 42 and provide a means for rapidly counting. The smaller saw-teeth 42 provide a means for accurately determining the area between the major saw-teeth 43. Therefore, it is seen that in the region lying under the peak 37 there are 110 saw-teeth, while under the portion 38 there are approximately 40. This saw-tooth tracing is a measure of the area under the various portions of the curve 36 and permits rapid evaluation of the curve. The greater the number of saw-teeth, of course, the greater the density of the paper strip. Thus it is seen that I have provided means for plotting the relative density of the strip 17, together with a saw-tooth trace which represents the area under the curve.

Referring to Figure 3, the chart 33 lies on the table 51 and travels past the recording pen 26 and integrating pen 29. The indicator 52 indicates the baseline position for the pen 26. This base line is adjusted in a manner which will be presently described.

The pens 26 and 29 and the pen carriage are located under the pen carriage cover 53. The cover 53 is adapted to lift at the end 54 and pivot about the pin 56. This permits replacing and inking the pens. The knob 57 is associated with means for simultaneously lifting the pens 26 and 29 and releasing the chart feed rollers, to be presently described.

The paper strip 17 is guided by the strip guide 58 as it travels past the slit. The handle 59 serves to release the paper roller in a manner to be presently described, with reference to Figure 7. This roller is contained within the housing 61. The member 62 houses the photoelectric cell 12, previously described in conjunction with Figure 1. The calibrated slide 63 permits adjustment of slit width of the adjustable slit 16 at the front panel of the instrument. The knob 64 moves the pen 26 when the servomotor 24 is disengaged to permit integrating a curve which has already been traced in a manner which will be presently described. The various control knobs 66 are also located on the front panel of the instrument.

The pen 26 (Figures 3 and 5) is carried by a mount 71 that is slidably mounted on the shaft 72. The pen moves along the shaft 72 transverse to the motion of the chart as shown at 73. The screw 74 holds the pen in the mount 71. It also provides a slight lateral adjustment of the pen. The cable 76 is attached to the pen and extends across the table 51, and thence down through the table over the pulleys 77 and 78. After passing over a pulley 77 (Figure 4) it passes over pulley 79 and is anchored on the drive member 80. The end of the cable which passes over the pulley 78 travels across underneath the table 51 and over pulleys 81 and 82 and is also anchored on the drive member 80. The pulley 79 is mounted on the arm 83 which is pivotally mounted by screw 84. The lever 86 has its far end connected to the spring 87. This spring has its other end attached to pin 88. The lever transmits a torque to the arm 83 and maintains the proper cable tension.

The drive member 80 is mounted on shaft 91 which connects to the servomotor (Figure 1). The shaft 91 also mounts the balancing cam 21, previously described, shown covering the portion of the slit 18. The cam assumes a position which equalizes the amount of illumination striking the two photocells 12 and 13 (Figure 1). As the cam 21 assumes this position, the driving member 80 will also assume a corresponding angular position. As the driving member 80 rotates, the cable 76 moves in such a manner as to cause the pen 26 (Figure 5) to move along the guide 72.

As the shaft 91 rotates, a gear (not shown) engages the rack 92 and causes the mounting shaft 93 to move in a longitudinal direction through bearing 94. This moves the integrator mounting 95 across the integrating disk 28 driven at constant speed. Referring to Figure 8, I have shown a side elevational view in section of the integrator 27 and the integrating disk 28. As the shaft 93 moves across the apparatus the integrator 27 moves across the integrating disk 28. This motion is indicated by the arrow 96 in Figure 9. Depending upon the distance from the center of the integrating disk 28, the integrator 27 will have different angular velocities. As it moves to the periphery the angular velocity will increase. The shaft 97 is splined to the integrator 27 and causes the generator 98 to rotate. The generator (Figure 8) is formed with a spiral contour going from a diameter 101 to a diameter 102 in one turn. Along the surface a series of saw-teeth 103 are formed. The lever 106 has one end 107 riding on the generator 98 and its other end 108 attached to the inner cable 109 of the flexible cable 111. The flexible cable 111 extends up to the underside of the table and is held by the bracket 112. The cable member 109 is attached to the crank arm 113 which causes the shaft 114 to rotate as the member 109 moves. The member 109 will move as shown at 116 (Figure 8) as the end 107 of the lever 106 moves along the surface of the generator 98. The other end of the shaft 114 is provided with a second crank 117 which rotates with the shaft 114. The end of the crank 117 is suitably attached to the end of the rod 118 (Figure 5) whereby when the crank is rotated the angular motion of the crank is converted into linear motion of the rod. The other end of the rod 118 is connected to the pen mount 121 which is slidably carried by the shaft 72. A spring 119 is carried by the rod 118 and urges the pen mount 121 towards the left. Because of the mechanical linkage of the pen mount through the shaft 118 to the lever 106, the lever is urged in a position which causes it to ride along the generator 98.

It is seen that as the integrator 27 is urged to the periphery of the integrating disk 28 it will rotate at a greater angular velocity and a greater number of saw-teeth 103 will pass under the lever 106. Consequently, a greater number of saw-teeth will be traced at 41 (Figure 5) during a given period of time. The saw-tooth member 103a, because of the spiral configuration of the generator 98, is considerably greater than the other saw-tooth members 103. Consequently, when the member 107 rides over the saw-tooth member 103a, a saw-tooth having a greater amplitude will be generated by the pen 29. This serves to mark every tenth saw-tooth generation. As previously described, the shaft 93 is mounted to move with the rack 92, and the rack 92 moves in conjunction with the cam 21. As the cam 21 moves to block out a greater area of the slit 18 to thereby reduce the illumination on the comparison photocell 13, the integrator 27 moves toward the periphery of the integrating disk 28, thereby rotating at a greater angular velocity. This causes a greater number of saw-tooth generations to occur for a given time. Thus I have provided a means for automatically integrating the area under the curve 36 by the integrator adapted to move with respect to the integrating disk 28.

A synchronous motor (not shown) is mounted within the housing 126. This motor drives the shaft 127. A bevel gear 128 and a worm gear 129 are splined to the shaft 127. The bevel gear 128 engages a bevel gear 131 which drives the integrating disk 28 at a constant angular velocity. The worm gear 129 engages the gear 132 which drives the shaft 133. Paper feed roller 34 and bevel gear 136 are splined to this shaft. The bevel gear 136 engages bevel gear 137 which drives the chart feed rollers 32 and 132. The chart feed roller 32 is mounted on a shaft which extends across the machine and mounts the second feed roller 132.

The light 11 (Figure 4) is mounted between the rigid members 141 and 142. Member 143 is loosely mounted by screws 144 and 146 to the member 142. The spring 147 urges the top portion of this member 143 against the member 142. This combination serves to hold the filter 148, the significance of which will be presently described. Likewise, member 151 is attached to member 141 by screws 152 and is urged by spring 153 to hold the filter 154. The aperture of the slit 18 may be varied by turning the screw member 156 to move the flap 157. The height of the slit 18 is controlled by a member (not shown) which likewise may be controlled by a screw. This member is adjacent the member 157 and moves from the top down. The adjustable slit 16 which is placed adjacent the paper strip 17 is not shown in this figure.

As previously described, the knob 57 (Figures 3, 5 and 6) lifts the pen from the paper and releases the chart from the feed rollers. Referring to Figure 6 wherein an exploded view of the apparatus is shown, I have shown the mechanism for carrying out these operations. As the knob 57 is pulled out, the bracket 161 is moved. A portion of this bracket engages the conical member 162 and thereby lifts the idling rollers 163 which press the chart 33 against the feed rollers 32 and 132. The member 164 mounted on the cross member 167 rides in the slot 166 which moves when the knob 57 is pulled. As the knob 57 is moved out, the end portion 168 of the member 167 rides on the cam 169. The member 167 moves downward as shown by arrow 171. This causes the member 167 to ride on the pen mounting extensions 172 and 173, thereby rotating the pens on the mounting shaft 172 and lifting them up away from the paper as shown. When the knob 57 is pressed in toward the apparatus, the member 167 rides up along the cam 169 and lifts as shown by arrow 174. Simultaneously, the member 161 rides away from the conical cam 162 and the roller 163 engages the chart 33 with the driving rollers 32 and 132. The member 167 lifts away from the members 172 and 173 thereby allowing the pens 26 and 29 to ride on the chart. If the chart 33 is not present, then the pens 26 and 29 will lower into the groove 176 which extends across the table. This groove is provided to prevent the pens from depositing ink on the table surface and thereby spot a new chart when it is placed on the apparatus. This groove may be provided with absorbent material.

In Figure 7, I have shown a partial section of the housing 61 together with the adjacent front cover of the apparatus. This section illustrates the roller 181 which urges the paper strip 17 against the driving roller 36. The handle 59 rotates the cam member 182 to urge this roller against the paper strip to thereby provide a positive drive. By rotating the handle 59, the member 182 is rotated and the flattened portion assumes a position opposite the roller 181. In this position, the roller 181 is urged out away from the paper strip 17 by the springs (not shown) and a new strip may be placed in the apparatus to take a new run.

For greater resolution and to reduce Biers law variations, it is desirable to provide a source of radiant energy which lies within a predetermined region of the spectrum. Generally, the wavelengths selected depend upon the color of the strip being analyzed. Thus, filters 148 and 154 are interposed between the source of radiant energy and the photoelectric cells to give the desired band of wavelengths of energy.

Assuming then that the filters have been properly selected, and that the cam is properly contoured, it is desirable to have the pen trace along the base line (Figure 2) when paper having no dye is passed across the slit. This is achieved by placing a paper strip 17 having no dye in the machine and then adjusting the member 157 by screw 156 to give a proper slit width 18 at the comparison photoelectric cell. It is desirable not only to have a base line calibration, but also to have a calibration at some known density. This is achieved by having paper strips which have a standard density and placing them in the machine. The member 19 (Figure 1) and described as a member which moves down from the top to vary the height of the slit is then moved to a position where the pen 26 will trace along a line which lies a predetermined distance above the base line. After this adjustment is made, the original paper strip 17 having no dye is placed in the machine and the zeroing slit is again adjusted. These operations are carried out alternately until the pen follows the base line and the calibration line.

Assuming now that the machine is calibrated and the paper strip having an unknown density is placed in the machine. The servomotor will rotate the cam 21 to maintain the illumination on the photoelectric cell 13 equal to that on the photoelectric cell 12. Consequently, the recording pen will trace a curve which corresponds to density along the strip and the integrator 27 will move the integrating disk 28 to give a trace 41 which corresponds to the area under the curve.

I have used a comparison method which uses the same light source 11. Therefore, variations in light output caused by changing line voltage, or variations in light output due to aging of the light 11 will not affect the density determination.

In Figure 10, I have shown an adaptor which is placed between the photocell 12 and the lenses. Thus the photocell which is housed in the housing 62 is unplugged and the adaptor 191 is inserted. The adaptor 191 has prongs (not shown) which interfit the receptacles which receive the photoelectric cell prongs (not shown). The adaptor 191 is provided with receptacles 192 electrically connected to its prongs for receiving the photocell prongs. The member 191 has slits 193 and 194 on opposite sides and receives a test tube or glass tubing. In Figure 10, I have shown a test tube 196 placed in the member 191. With this attachment the apparatus may be used for automatically recording changing conditions taking place in a reaction.

In certain reactions the changes which take place do not give rise to visible color changes. Also, in certain electrophoresis methods the various protein constituents of the solution are separated but not dyed. By replacing the light 11 with an ultraviolet lamp such as one of those used in ultraviolet light sterilizers and placing the solution in a quartz test tube or on very thin paper, it has been found that the changing conditions taking place in the reaction or the protein separation in the electrophoresis investigation can be measured.

It is apparent from the preceeding discussion that the apparatus may be used as a colorimeter to provide a quantitative chemical analysis. Depending upon the light source used, it may be used for colorimetry both in the visible and ultraviolet regions of the spectrum for continuous analysis as well as analysis of a particular sample.

The apparatus may also be used to maintain the pH of a solution constant. The cam shaft 91 may be extended and employed to control apparatus which feeds reagent into the solution. The plotted curve will show the rate of addition of reagent and when the reaction has been completed.

Radioactive scanning may be achieved by scanning the paper strip or solution with a Geiger tube. The output of the Geiger tube may then be fed into a rate meter. The resulting signal is fed into the apparatus to drive the pen and trace a curve which will show the radioactivity at any particular time or point along the paper strip. Thus it is possible to first scan a paper strip for optical density and then scan the same strip for radioactivity. If the curves obtained are compared, one may determine which protein fraction is radioactive.

Provision is made for disengaging the servomotor 24. With the motor disengaged, a chart containing a curve may be placed on the table and by rotation of dial 64 the pen 26 may be made to trace along the curve as the paper chart is fed through the apparatus. Rotation of the dial 64 moves the ratchet member 92 and causes the integrator to move along the integrating disk 28. Consequently, by moving the pen along the curve, the area under the curve is automatically integrated and a sawtooth trace is traced by the pen 29. It is seen that this method is more accurate than the well-known planimeter method and can be performed much more rapidly. It is also less subject to errors since there are no mathematical computations or differences of readings to be made. The saw-tooth trace is easily read and continuous integration of the curve is obtained. Further, the fidelity with which the pen is moved along the curve may be checked since it draws a second curve.

If the two curves are traced on the chart, the integrating pen may be placed in one position for one curve and in its other position for the other curve. Thus two saw-tooth traces will result. One will correspond to the area under one curve and the other to the area under the other curve. By comparing the traces, the area between the curves can be readily obtained.

Thus, I have provided apparatus suitable for analyzing mediums with respect to variations in light transmission characteristics. For example, the apparatus is suitable for quickly and accurately analyzing electrophoresis strips. Further, the apparatus may be used as a colorimeter to provide quantitative chemical analyses. Depending upon the light source used, the apparatus may be used in the visible or ultraviolet regions of the spectrum.

I claim:

1. Analyzing apparatus of the type adapted to measure the optical density along a strip material and serving to trace a curve of the density on a chart comprising a source of radiant energy, first and second photoelectric means disposed to receive energy from said source and having their electrical outputs opposed to generate a difference voltage, a first adjustable slit disposed between said first photoelectric means and said source and providing means for adjusting the resolution of the apparatus, a second adjustable slit located between said source and said second photoelectric means and providing means for zeroing the apparatus, means for driving the strip material past said first slit whereby energy transmitted by the adjacent portion of said strip is incident upon said first photoelectric means, a chart table, means for driving the chart, said paper strip and chart driving means being adapted to simultaneously drive said paper strip and chart whereby the distance along said chart may be correlated with distance along said paper strip, a cam shaped shutter disposed between said second photoelectric means and said source and adapted to control the energy incident upon said second photoelectric means, a driven shaft serving to mount said cam shaped shutter, servo means adapted to receive said difference voltage and serving to drive said shaft whereby the shutter is rotated until the difference voltage is reduced to zero, a pen, means serving to guide said pen transversely across the chart, a continuous cable connected to said pen and adapted to move the pen, and a drive member mounted on said shaft and adapted to receive said cable whereby the pen is moved a distance which corresponds to the angular rotation of said shaft, whereby a trace of the optical density as a function of distance along the strip material is plotted on the chart.

2. Analyzing apparatus of the type adapted to measure the optical density along a strip material and serving to trace a curve of the density as a function of distance along the strip comprising a source of radiant energy, first and second photoelectric means disposed to receive energy from said source and having their electrical outputs opposed to generate a difference voltage, a first slit disposed between said first photoelectric means and said source, a second slit disposed between said source and said second photoelectric means, means for driving the strip material past said first slit whereby the energy transmitted by the adjacent portion of the strip is incident upon the said first photoelectric means, a chart table, means for driving the chart along said table, said means for driving said strip material and said chart having common driving means whereby the movement of said chart and said strip material is synchronized, a cam shaped shutter disposed between said second photoelectric means and said source and adapted to control the energy incident upon said second photoelectric means, a driven shaft serving to mount said cam shaped shutter, servo means connected to receive said difference voltage and drive said shaft whereby the shutter is rotated until the difference voltage is reduced to zero, a pen, guide means serving to guide said pen transverse to the direction of movement of said chart, a continuous cable connected to said pen and adapted to move the same along said guide means, a driven member mounted on said shaft and adapted to receive said cable to move the pen a distance which corresponds to the rotation of said shaft whereby the trace will have amplitudes which correspond to the optical density of the paper strip material, integrating means serving to integrate the area under said trace, said means comprising an integrating disc adapted to be rotated at constant angular velocity, an integrator adapted to be driven by said integrating disc, means connected to said shaft and said integrator and serving to move the same along said disc a distance corresponding to the angular rotation of said cam, a generator adapted to rotate with said integrator and having a plurality of indentations thereon, a lever having one end thereof adapted to ride in said indentation, an integrating pen mounted on said guide means, means for connecting said integrating pen to the other end of said lever whereby movement of said lever urges said pen across the chart whereby a series of saw teeth are traced on said chart which correspond to the area under the curve.

3. Apparatus as in claim 2 wherein said generator is formed with a spiral contour having a series of saw teeth formed thereon whereby large saw teeth are traced with a plurality of smaller saw teeth traced therebetween permitting rapid interpretation of the integration.

4. Analyzing apparatus of the type adapted to measure the optical density along strip material and serving to trace a curve of the density as a function of distance on a chart comprising a source of radiant energy, first and second photoelectric means disposed to receive energy from said source and having their electrical outputs opposed to generate a difference voltage, a first slit disposed between said first photoelectric means and said source, a second slit located between said source and said photoelectric means, means for driving the strip material past said first slit whereby energy transmitted by the adjacent portion of the strip is incident upon the first photoelectric means, a chart table, a pair of opposed rollers serving to receive and drive said chart, said paper strip and chart driving means being adapted to simultaneously drive said paper strip and chart whereby the distance along said chart may be correlated with the distance along the paper strip, a cam shaped shutter disposed between said second photoelectric means and said source and adapted to control the energy incident upon said second photoelectric means, a driven shaft serving to mount said cam shaped shutter, servo means adapted to receive said difference voltage and serving to drive said shaft whereby the shutter is rotated until the difference voltage is reduced to zero, a pen, means serving to guide said pen transversely across the chart, a continuous cable connected to said pen and adapted to move the pen, a drive member mounted on said shaft and adapted to receive said cable whereby the pen is moved a distance which corresponds to the angular rotation of said shaft to trace a curve of the optical density as a function of distance along the strip material, and means for simultaneously releasing the chart drive rollers and lifting the pen comprising a transverse member adapted to engage and lift the pen, a cam follower formed on one end of said member, a fixed cam adapted to receive said follower, a conical member attached to the end of one of said drive rollers and forming a cam surface, means adapted to engage said conical member to lift the associated roller, said means adapted to simultaneously move the transverse member whereby it is lowered to lift the pen.

References Cited in the file of this patent

UNITED STATES PATENTS

| 1,278,994 | Pendleton | Sept. 17, 1918 |
| 1,520,874 | Lauritsen | Dec. 30, 1924 |
| 2,073,223 | Rose | Mar. 9, 1937 |
| 2,139,474 | Shepard | Dec. 6, 1938 |
| 2,159,882 | Borden | May 23, 1939 |

FOREIGN PATENTS

| 1,024,076 | France | Jan. 7, 1953 |